United States Patent Office 3,794,672
Patented Feb. 26, 1974

3,794,672
PERFLUOROALKYL SILICON COMPOUNDS CONTAINING SULFUR
Yung K. Kim, Midland, Mich., assignor to Dow Corning Corporation, Midland, Mich.
No Drawing. Filed July 5, 1973, Ser. No. 376,509
Int. Cl. C07f 7/08, 7/18
U.S. Cl. 260—448.2 N          4 Claims

ABSTRACT OF THE DISCLOSURE

Perfluoroalkyl silyl sulfides are prepared by reacting $R_fCH{=}CH_2$ with $HSRSI{-}{=}$ in the presence of a free radical generator such as organic peroxides. The products are useful for treating fabrics to render them oleophobic and water repellent. For example, trifluoropropene is added to mercaptopropyltrimethoxysilane to give $$CF_3CH_2CH_2S(CH_2)_3Si(OCH_3)_3$$

This can be hydrolyzed to the siloxane $$CF_3CH_2CH_2S(CH_2)_3SiO_{1.5}$$

SPECIFICATION

This invention relates to organosilicon compounds of the formula $$R_fCH_2CH_2SR\underset{\underset{2}{3-n-m}}{\overset{(CH_3)_n}{Si}}X_mO$$

in which $R_f$ is a perfluoroalkyl radical of from 1 to 4 carbon atoms, R is an alkylene radical of 1 to 4 carbon atoms, X is chlorine, acetoxy, alkoxy of 1 to 3 carbon atoms or $O(CH_2CH_2O)_aR''$ in which $a$ is 1 or 2 and $R''$ is methyl or ethyl; $n$ is 0 to 2 and $m$ is 0 to 3; the sum of $n+m$ being not greater than 3.

As can be seen, the compounds of this invention can be silanes or siloxanes and the latter can be either homopolymers or copolymers. Where Y is the $$R_fCH_2CH_2SR{-}$$

group, the organosilicon compounds can be represented by silanes of the formula $YSiX_3$, $Y(CH_3)SiX_2$ or $Y(CH_3)_2SiX$ and siloxanes of the unit formula $YSiO_{1.5}$, $Y(CH_3)SiO$, $Y(CH_3)_2SiO_{.5}$, $YXSiO$, $YX_2SiO_{.5}$ and $$Y(CH_3)XSiO_{.5}.$$

All of the above compounds whether silanes, homopolymeric siloxanes, or copolymeric siloxanes are characterized by having one Y group attached to each silicon atom. The copolymeric siloxanes contain two or more of the above siloxane units.

This invention also relates to copolymers of the unit formula $$R_fCH_2CH_2SR\underset{\underset{2}{3-n-m}}{\overset{(CH_3)_n}{Si}}X_mO$$

and siloxane units of the formula $$A_bSiO_{\frac{4-b}{2}}$$

in which $R_f$, R, and X are as above defined, $n$ has a value from 0 to 2, and $m$ has a value from 0 to 2, the sum of $n+m$ being not greater than 2, A is methyl, phenyl or $OF_3CH_2CH_2{-}$, and $b$ is 0 to 3.

These copolymers are characterized by the fact that some silicon atoms have the Y group attached thereto and some do not. Thus, it can be seen that any one or more of the Y containing siloxane units shown above can be copolymerized with any one or more of units such as $SiO_2$, $ASiO_{1.5}$, $A_2SiO$, and $A_3SiO_{.5}$.

The siloxanes of this invention can be in the form of fluids, resins, or rubbers. These can be prepared by any of the conventional well-known techniques for making siloxane fluids, resins, or rubbers.

The compositions of this invention are prepared by reacting olefins of the formula $$R_fCH{=}CH_2 \text{ with } HSR\underset{\underset{2}{3-n-m}}{\overset{(CH_3)_n}{Si}}X_mO$$

in the presence of free radical generators such as peroxides such as, benzoyl peroxide or ditertiary butyl peroxide or azobisnitriles such as azobisisobutyro nitrile or radiant energy such as ultraviolet light, X-rays, or gamma rays. Combinations of these methods can be employed if desired. The temperature at which the reaction is carried out is not critical and generally temperatures in the range of from room temperature to 150° C. or above are sufficient.

The siloxanes of this invention can alternatively be prepared by hydrolyzing and cohydrolyzing the corresponding hydrolyzable silanes. This procedure is carried out by the well-known hydrolytic procedures shown in the art.

The olefins $R_fCH{=}CH_2$ are known materials and can be prepared by any convenient method such as the method shown in U.S. Pat. 3,012,006, Col. 2, the disclosure of which is hereby incorporated by reference.

The starting mercapto silicon compounds can be prepared by any of the methods shown in the art, for example, by the method shown in British Pat. 1,102,251 which sets forth the general reaction $NaSH+ClRSi{-}{=}$ or the method shown in the publication "Synthesis and Reactions of Sulfur Compounds," by Gornowicz and Speier appearing in "Mechanisms of Reactions of Sulfur Compounds," volume 3, 1968, which involves the addition of mercapto acetic acid to alkenyl silicon compounds. Finally, the mercapto materials can be prepared by the method shown in U.S. Pat. 3,314,982, which involves the reaction of thiourea with $ClRSi{-}{=}$ compounds to give the corresponding thiuronium salt and thereafter decomposing said salt to the corresponding mercaptan. Both of the above patents and the above publication are hereby incorporated by reference. In addition, the best method for making chlorosilanes is to react an alkenyl chlorosilane with liquid $H_2S$ under ultraviolet light.

For the purpose of this invention, $R_f$ can be any perfluoroalkyl radical of from 1 to 4 carbon atoms such as $CF_3$, $C_2F_5$, $C_3F_7$, or $C_4F_9$. These radicals can be either linear or branched. R can be any alkylene radical of from 1 to 4 carbon atoms such as methylene, dimethylene, trimethylene, tetramethylene or isobutylene. X can be chlorine or alkoxy 1 to 3 carbon atoms such as methoxy, ethoxy, propoxy or isopropoxy or $O(CH_2CH_2O)_aR''$ radicals such as $OCH_2CH_2OCH_3$, $$OCH_2CH_2OCH_2CH_2OCH_3,$$
$$OCH_2CH_2OC_2H_5 \text{ and}$$
$$OCH_2CH_2OCH_2CH_2OC_2H_5$$

The compositions of this invention are useful for treating fabrics to render them water repellent and oleophobic. Those compositions containing the lower perfluoroalkyl radicals are also useful as extenders for those compositions containing higher perfluoroalkyl radicals. Extenders are often used in fabric treatments in order to cheapen the composition where a very expensive material such as the higher perfluoroalkyl materials are being employed.

In addition, the compositions of this invention are useful as lubricants.

The following examples are illustrative only and should not be construed as limiting the invention which is properly delineated in the appended claims.

EXAMPLE 1

A mixture of 576 g. of mercaptopropyltrimethoxysilane, 317 g. of $CF_3CH=CH_2$ and 13 g. of di-t-butyl peroxide were reacted in a two liter stainless steel pressure reactor while stirring at 120° C. under autogenous pressure for 23 hours. The liquid product was distilled to yield $CF_3CH_2CH_2S(CH_2)_3Si(OCH_3)_3$, boiling point 118° at 9 mm. and having a refractive index of 1.4158. The molecular weight by vapor pressure osmometry was found to be 294 as compared with the calculated value of 292. The structure of the compound was further established by carbon, hydrogen and sulfur analysis.

EXAMPLE 2

A mixture of 100 g. of

400 ml. of ether, 300 ml. of water, and 50 ml. of acetic acid were heated under reflux while stirring for 15 hours. The ether layer was separated, washed with saturated sodium bicarbonate solution then with water and finally dried over anhydrous calcium sulfate. After removal of the ether, there was obtained a viscous fluid of the unit formula $CF_3CH_2CH_2S(CH_2)_3SiO_{1.5}$.

EXAMPLE 3

When 3,3,3-trifluoropropene-1 is reacted with the following silanes under the conditions of Example 1, the following products are obtained.

| Silane | Product |
|---|---|
| $HSCH_2Si(OCH_3)_3$ | $CF_3CH_2CH_2SCH_2Si(OCH_3)_3$ |
| $HSCH_2CH_2Si(OCH_3)_3$ | $CF_3CH_2CH_2SCH_2CH_2Si(OCH_3)_3$ |
| $HS(CH_2)_3\overset{CH_3}{\underset{|}{Si}}(OC_2H_5)_2$ | $CF_3(CH_2)_2S(CH_2)_3\overset{CH_3}{\underset{|}{Si}}(OC_2H_5)_2$ |
| $HS(CH_2)_3\overset{(CH_3)_2}{\underset{|}{Si}}OCH_2CH_2OCH_3$ | $CF_3(CH_2)_2S(CH_2)_3\overset{(CH_3)_2}{\underset{|}{Si}}OCH_2CH_2OCH_3$ |
| $HS(CH_2)_3\overset{CH_3}{\underset{|}{Si}}(OCH_2CH_2)_2OC_2H_5$ | $CF_3(CH_2)_2S(CH_2)_3\overset{CH_3}{\underset{|}{Si}}(OCH_2CH_2)_2OC_2H_5$ |
| $HS(CH_2)_3Si(O\overset{O}{\overset{\|}{C}}CH_3)_3$ | $CF_3(CH_2)_2S(CH_2)_3Si(O\overset{O}{\overset{\|}{C}}CH_3)_3$ |
| $HSCH_2CH_2CH_2SiCl_3$ | $CF_3(CH_2)_2S(CH_2)_3SiCl_3$ |
| $HSCH_2CH_2\overset{CH_3}{\underset{|}{Si}}Cl_2$ | $CF_3(CH_2)_2S(CH_2)_2\overset{CH_3}{\underset{|}{Si}}Cl_2$ |

EXAMPLE 4

When the following mercapto alkyl siloxanes are reacted with 3,3,3-trifluoropropene-1 in accordance with the procedure of Example 1, the following products are obtained.

| Siloxane | Product |
|---|---|
| $HSCH_2Si[OSi(CH_3)_3]_3$ | $CF_3(CH_2)_2SCH_2Si[OSi(CH_3)_3]_3$ |
| $HS(CH_2)_3\overset{(OCH_3)_2}{\underset{|}{Si}}O[Si(CH_3)_2O]_{25}H$ | $CF_3(CH_2)_2S(CH_2)_3\overset{(OCH_3)_2}{\underset{|}{Si}}O[Si(CH_3)_2O]_{25}H$ |
| $[HS(CH_2)_2\overset{(CH_3)_2}{\underset{|}{Si}}O]_4Si$ | $[CF_3(CH_2)_2S(CH_2)_2\overset{(CH_3)_2}{\underset{|}{Si}}O]_4Si$ |
| $\left(HS(CH_2)_3\overset{CH_3}{\underset{|}{Si}}O_4\right)$ | $[CF_3(CH_2)_3S(CH_2)_3\overset{CH_3}{\underset{|}{Si}}O]_4$ |
| $[HSCH_2\overset{CH_3}{\underset{|}{C}}H\overset{(CH_3)_2}{\underset{|}{C}}HCH_2Si]_2O$ | $[CF_3(CH_2)_2SCH_2\overset{CH_3}{\underset{|}{C}}H\overset{(CH_3)_2}{\underset{|}{C}}HCH_2Si]_2O$ |

EXAMPLE 5

When the following silanes are hydrolyzed or cohydrolyzed according to the method of Example 2, the following siloxanes are obtained.

| Mol percent | Silane mixture of— | Mol percent | Siloxane copolymer of— |
|---|---|---|---|
| 50 | $CF_3(CH_2)_2S(CH_2)_3\overset{CH_3}{\underset{|}{Si}}(OCH_3)_2$ | 50 | $CF_3(CH_2)_2S(CH_2)_3\overset{CH_3}{\underset{|}{Si}}O$ |
| 50 | $(CH_3)_2Si(OCH_3)_2$ | 50 | $(CH_3)_2SiO$ |
| 25 | $CF_3(CH_2)_2S(CH_2)_3Si(OCH_3)_3$ | 25 | $CF_3(CH_2)_2S(CH_2)_3SiO_{1.5}$ |
| 25 | $C_6H_5Si(OCH_3)_3$ | 25 | $C_6H_5SiO_{1.5}$ |
| 25 | $CF_3CH_2CH_2\overset{CH_3}{\underset{|}{Si}}(OCH_3)_2$ | 25 | $CF_3CH_2CH_2\overset{CH_3}{\underset{|}{Si}}O$ |
| 25 | $(CH_3)_2Si(OCH_3)_2$ | 25 | $(CH_3)_2SiO$ |
| 25 | $CF_3(CH_2)_2S(CH_2)_3Si(OCH_3)_3$ | 25 | $CF_3(CH_2)_2S(CH_2)_3SiO_{1.5}$ |
| 25 | $C_6H_5(CH_3)Si(OCH_3)_2$ | 25 | $C_6H_5(CH_3)SiO$ |
| 10 | $(C_6H_5)_2Si(OCH_3)_2$ | 10 | $(C_6H_5)_2SiO$ |
| 40 | $CH_3Si(OCH_3)_3$ | 40 | $CH_3SiO_{1.5}$ |

EXAMPLE 6

When $C_4F_9CH=CH_2$ is reacted with the following silanes or siloxanes in accordance with the procedure of Example 1, the following products are obtained.

| Silane | Product |
|---|---|
| $HSCH_2Si(OCH_3)_3$ | $C_4F_9CH_2CH_2SCH_2Si(OCH_3)_3$ |
| $HSCH_2CH_2\overset{\underset{\displaystyle CH_3}{\mid}}{Si}(OCH_3)_2$ | $C_4F_9CH_2CH_2S(CH_2)_2\overset{\underset{\displaystyle CH_3}{\mid}}{Si}(OCH_3)_2$ |
| $HS(CH_2)_3\overset{\underset{\displaystyle (CH_3)_2}{\mid}}{Si}OCH_3$ | $C_4F_9CH_2CH_2S(CH_2)_3\overset{\underset{\displaystyle (CH_3)_2}{\mid}}{Si}OCH_3$ |

| Siloxane | |
|---|---|
| $HS(CH_2)_3Si\{OSi(CH_3)_2C_6H_5\}_3$ | $C_4F_9CH_2CH_2S(CH_2)_3Si\{OSi(CH_3)_2C_6H_5\}_3$ |
| 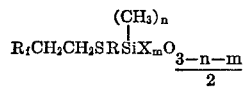 | 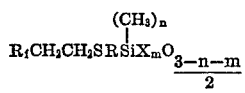 |
| $HS(CH_2)_3Si\{OSi(CH_3)_3\}_3$ | $C_4F_9CH_2CH_2S(CH_2)_3Si\{OSi(CH_3)_3\}_3$ |

That which is claimed is:

1. An organosilicon compound of the formula $$R_fCH_2CH_2SR\overset{\underset{\displaystyle (CH_3)_n}{\mid}}{Si}X_mO_{\frac{3-n-m}{2}}$$

in which $R_f$ is a perfluoroalkyl radical of 1 to 4 carbon atoms, R is an alkylene radical of 1 to 4 carbon atoms, X is chlorine, acetoxy, alkoxy of 1 to 3 carbon atoms, or $O(CH_2CH_2O)_aR''$ in which $a$ is 1 or 2 and $R''$ is methyl or ethyl, $n$ is 0 to 2, $m$ is 0 to 3, the sum of $n+m$ being not greater than 3.

2. The composition of claim 1 in which $R_f$ is $CF_3$.

3. Copolymers containing at least one siloxane unit of the formula $$R_fCH_2CH_2SR\overset{\underset{\displaystyle (CH_3)_n}{\mid}}{Si}X_mO_{\frac{3-n-m}{2}}$$

and the remaining siloxane units being of the formula $$A_bSiO_{\frac{4-b}{2}}$$

in which $R_f$ is a perfluoroalkyl radical of 1 to 4 carbon atoms, R is an alkylene radical of 1 to 4 carbon atoms, X is chlorine, acetoxy, alkoxy of 1 to 3 carbon atoms or $-O(CH_2CH_2O)_aR''$ in which $a$ is 1 or 2 and $R''$ is methyl or ethyl, $n$ and $m$ are both 0 to 2, the sum of $n+m$ being not greater than 2, A is methyl, phenyl or $CF_3CH_2CH_2-$ and $b$ is 0 to 3.

4. The composition of claim 3 in which $R_f$ is $CF_3$.

References Cited
UNITED STATES PATENTS

| | | | |
|---|---|---|---|
| 2,719,165 | 9/1955 | Cooper | 260—448.2 N |
| 2,960,492 | 11/1960 | Morton et al. | 260—448.2 N X |
| 3,532,733 | 10/1970 | Lee | 260—448.8 R |

DANIEL E. WYMAN, Primary Examiner

P. F. SHAVER, Assistant Examiner

U.S. Cl. X.R.

260—448.8 R, 46.5 E